United States Patent
Su et al.

(10) Patent No.: US 9,521,701 B2
(45) Date of Patent: Dec. 13, 2016

(54) CONFLICT HANDLING IN A DEVICE CONFIGURED TO OPERATE ACCORDING TO MULTIPLE CELLULAR COMMUNICATION PROTOCOLS

(71) Applicant: Apple Inc., Cupertino, CA (US)

(72) Inventors: Li Su, San Jose, CA (US); Ziv Wolkowicki, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 226 days.

(21) Appl. No.: 13/901,645

(22) Filed: May 24, 2013

(65) Prior Publication Data

US 2014/0349646 A1  Nov. 27, 2014

Related U.S. Application Data

(60) Provisional application No. 61/698,659, filed on Sep. 9, 2012.

(51) Int. Cl.
*H04W 76/04* (2009.01)
*H04W 76/02* (2009.01)
*H04W 88/06* (2009.01)

(52) U.S. Cl.
CPC ......... *H04W 76/048* (2013.01); *H04W 76/026* (2013.01); *H04W 88/06* (2013.01)

(58) Field of Classification Search
None
See application file for complete search history.

(56) References Cited

U.S. PATENT DOCUMENTS

| 7,966,017 B2 | 6/2011 | Kim et al. | |
|---|---|---|---|
| 8,699,464 B1* | 4/2014 | Vivanco | H04W 28/0289 370/331 |
| 2008/0160918 A1* | 7/2008 | Jeong | H04W 52/0216 455/67.11 |
| 2010/0029325 A1* | 2/2010 | Wang | H04W 72/1215 455/553.1 |
| 2010/0240367 A1* | 9/2010 | Lee | H04W 36/0077 455/435.2 |
| 2012/0164948 A1* | 6/2012 | Narasimha | H04W 72/1215 455/63.1 |
| 2013/0090137 A1* | 4/2013 | Krishnamoorthy | H04W 68/02 455/458 |
| 2013/0201890 A1* | 8/2013 | Swaminathan | H04W 88/06 370/311 |

(Continued)

*Primary Examiner* — Vladimir Magloire
*Assistant Examiner* — Frank Donado
(74) *Attorney, Agent, or Firm* — Meyertons Hood Kivlin Kowert & Goetzel, P.C.; Jeffrey C. Hood

(57) ABSTRACT

Handling conflicts between radio access technologies (RATs) in a device configured to operate according to multiple RATs. The device may be operated in a discontinuous reception (DRX) mode according to each of a first RAT and a second RAT using a shared radio. It may be determined that a conflicting wakeup time is scheduled according to DRX cycles of the first and second RATs. The radio may be operated according to the first RAT at the conflicting wakeup time. The second RAT may not use the radio at the conflicting wakeup time. A next wakeup time for the second RAT may be determined from multiple possible next wakeup times. The radio may be operated according to the second RAT at the determined next wakeup time.

28 Claims, 4 Drawing Sheets

(56) References Cited

U.S. PATENT DOCUMENTS

| | | | |
|---|---|---|---|
| 2013/0201892 A1* | 8/2013 | Holma | H04W 76/048 370/311 |
| 2013/0225211 A1 | 8/2013 | Lebreton et al. | |
| 2013/0237257 A1 | 9/2013 | Walke et al. | |
| 2013/0301420 A1 | 11/2013 | Zhang et al. | |
| 2013/0310109 A1* | 11/2013 | Filipovic | H04B 7/0608 455/553.1 |
| 2013/0315215 A1* | 11/2013 | Beale | H04W 72/1252 370/336 |
| 2014/0120859 A1* | 5/2014 | Ekici | H04W 4/22 455/404.1 |
| 2014/0148150 A1 | 5/2014 | Clevorn | |

\* cited by examiner

US 9,521,701 B2

CONFLICT HANDLING IN A DEVICE CONFIGURED TO OPERATE ACCORDING TO MULTIPLE CELLULAR COMMUNICATION PROTOCOLS

PRIORITY CLAIM

The present application claims benefit of priority to U.S. Provisional Application No. 61/698,659 titled "Conflict Handling in a Device Configured to Operate According to Multiple Cellular Communication Protocols" and filed on Sep. 9, 2012, whose inventors are Li Su and Ziv Wolkowicki, and which is hereby incorporated by reference in its entirety as though fully and completely set forth herein.

FIELD

The present application relates to the field of wireless communication, and more particularly to a system and method for handling conflicts between cellular communication protocols in a device configured to operate according to multiple cellular communication protocols.

DESCRIPTION OF THE RELATED ART

Wireless communication systems are rapidly growing in usage. Further, wireless communication technology has evolved from voice-only communications to also include the transmission of data, such as Internet and multimedia content. As wireless communication systems evolve, successive generations of wireless communication technologies tend to be developed. Adoption of a new generation wireless technology may be a gradual process, during which one or more previous generations of a similar technology may co-exist with the new generation technology, e.g., for a period of time until the new generation wireless technology is fully deployed.

Additionally, there exist numerous different wireless communication technologies and standards. Some examples of wireless communication standards include GSM, UMTS, LTE, CDMA2000 (e.g., 1xRTT, 1xEV-DO), IEEE 802.11 (WLAN or Wi-Fi), IEEE 802.16 (WiMAX), Bluetooth, and others. Some of these standards may serve complementary functions while others may typically be considered competitors attempting to fulfill similar needs amongst consumers.

In order to provide continuity between generations of wireless communication technologies, in order to provide complementary functionality, and/or for other reasons, it may often be desirable to provide the ability for a device to communicate using multiple wireless technologies or standards. In some cases, this may be accomplished by providing separate functional blocks for each wireless communication technology or standard in a device. However, this may incur additional costs associated with the device due to more (and in some cases duplicate) components being required, and may introduce inefficiencies in device operation (e.g., greater power requirements due to multiple radios, interference between radios adversely affecting each other). This may also adversely affect the form factor of the device, especially if the device is a mobile device for which a smaller (e.g., slimmer, lighter) form factor may be desirable.

An alternative might include a device which uses a single functional block (e.g., a single radio) to implement multiple wireless communication technologies. However, sharing a single radio between multiple wireless technologies has its own set of challenges. For example, if only one wireless technology can use the radio at a time, there may occasionally (or frequently) be conflicts between the wireless technologies for use of the radio. Accordingly, improvements in wireless communications and devices performing wireless communications would be desirable.

SUMMARY

As noted above, a device which uses a single functional block (e.g., a single radio) to implement multiple wireless communication technologies may have significant advantages relative to a device which uses separate functional blocks (e.g., separate radios) to implement different wireless communication technologies. Such a device could potentially have a lower manufacturing cost (e.g., due to fewer required components and/or simpler overall architecture) and more efficient operation (e.g., due to lower power requirements for the single radio). Additionally, such a single radio design may readily allow for a more desirable form factor (e.g., slimmer, lighter) of the device itself. However, in order to provide a single radio which effectively implements multiple wireless technologies, sophisticated control algorithms may be necessary.

As one example, in some cases a device may implement separate protocol stacks for each of multiple radio-access technologies (RATs) that share a radio. The protocol stacks may take turns operating the radio. If both protocol stacks are scheduled to use the radio at the same time, there may be a conflict or collision between the RATs.

For example, if both RATs are operating in a discontinuous reception (DRX) mode, such as an idle mode or a connected-mode DRX, it is possible that scheduled wake-up times could conflict. In other words, both RATs could be scheduled to use the radio at the same time. Accordingly, providing a way to handle such potential conflicts may be an important consideration.

The present disclosure relates to a system and method for intelligently handling such conflicts between RATs in a device configured to operate according to multiple RATs. Embodiments of the disclosure may thus be directed to such a method for handling conflicts between RATs in a UE device configured to communicate using multiple RATs, to a UE device configured to implement such a method, and/or to a computer accessible memory medium storing program instructions executable by a processor to implement such a method.

For example, in some cases a first RAT may be given priority during such conflicts and may generally be allowed to operate during the time of conflict while operations according to a second RAT are suspended. The first RAT (e.g., the RAT selected as the higher priority RAT) may be selected for any of a variety of reasons, such as differences in frequency of use, throughput differences, differences in DRX cycle lengths, length of time since a previous wakeup, or any of a variety of other reasons. The selection may be consistent and fixed (e.g., every time a conflict occurs, the first RAT may be given priority) or variable on a case-by-case basis.

It may also be determined when would be an appropriate next wakeup time for the second RAT (e.g., that RAT whose operations are suspended during the time of conflict). For example, in some cases, it may be appropriate for the second RAT to operate substantially immediately after the first RAT finishes operations in the time of conflict. This may be appropriate, for example, if there is data pending for uplink transmission according to the second RAT. Another reason might be if the most recent signal strength measurements for the serving cell according to the second RAT are old (stale) or lower than ideal, in which case it may be important to perform serving and/or neighboring cell signal strength measurements as soon as possible, in case cell re-selection is necessary.

Alternatively, if there is no data pending for uplink transmission according to the second RAT, and recent signal strength measurements for the serving cell according to the second RAT are sufficiently strong and recent, there may be no need for the second RAT to operate substantially immediately after the first RAT finishes operations in the time of conflict. Instead, in such cases, it may be better to wait for the next scheduled DRX wakeup for the second RAT, e.g., in order to conserve battery.

Thus, according to the present disclosure, conflicts between RATs sharing a radio in a wireless device may advantageously be handled in a manner that supports timely cell search and measurement operations needed to maintain or improve the device's serving cell connection while avoiding such battery draining operations when the device's connection to the serving cell is stable and there is no pressing need to use the radio.

BRIEF DESCRIPTION OF THE DRAWINGS

A better understanding of the present subject matter can be obtained when the following detailed description of the preferred embodiment is considered in conjunction with the following drawings, in which.

Figure 1:
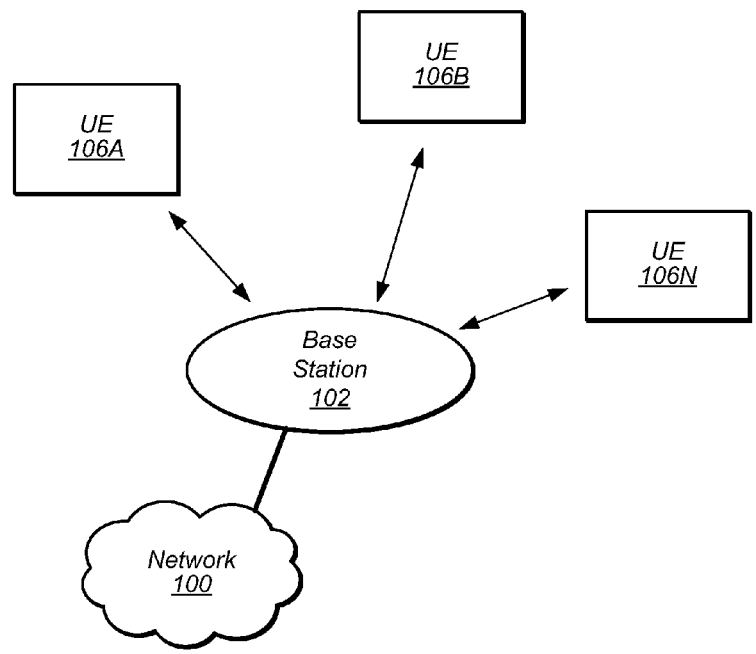
FIG. 1 illustrates an exemplary wireless communication system.

While the features described herein susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present disclosure.

3GPP: Third Generation Partnership Project
3GPP2: Third Generation Partnership Project 2
GSM: Global System for Mobile Communications
UMTS: Universal Mobile Telecommunications System
LTE: Long Term Evolution Terms The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
FIG. 2 illustrates a base station in communication with a user equipment device.

FIGS. 1-2—Communication System

FIG. 1 illustrates an exemplary (and simplified) wireless communication system. It is noted that the system of FIG. 1 is merely one example of a possible system, and embodiments may be implemented in any of various systems, as desired.

As shown, the exemplary wireless communication system includes a base station 102 which communicates over a transmission medium with one or more user devices 106A through 106N. Each of the user devices may be referred to herein as a "user equipment" (UE). Thus, the user devices are referred to as UEs or UE devices.

The base station 102 may be a base transceiver station (BTS) or cell site, and includes hardware that enables wireless communication with the user devices 106A through 106N. The base station 102 may also be equipped to communicate with a network 100. Thus, the base station 102 may facilitate communication between the user devices and/or between the user devices and the network 100.

The base station 102 and the user devices may be configured to communicate over the transmission medium using any of various radio access technologies ("RATs", also referred to as wireless communication technologies) or telecommunication standards such as GSM, UMTS (WCDMA), LTE, LTE-Advanced (LTE-A), 3GPP2 CDMA2000 (e.g., 1xRTT, 1xEV-DO, HRPD, eHRPD), etc.

UE 106 may be capable of communicating using multiple wireless communication standards. For example, a UE 106 might be configured to communicate using either of a 3GPP cellular communication standard (such as LTE) or a 3GPP2 cellular communication standard (such as a cellular communication standard in the CDMA2000 family of cellular communication standards). Thus in some embodiments, the UE 106 might be configured to communicate with base station 102 according to a first cellular communication standard (e.g., LTE) and might also be configured to communicate with other base stations according to a second cellular communication standard (e.g., one or more CDMA2000 cellular communication standards). Base station 102 and other similar base stations operating according to the same or a different cellular communication standard may thus be provided as a network of cells, which may provide continuous or nearly continuous overlapping service to UE 106 and similar devices over a wide geographic area via one or more cellular communication standards.

The UE 106 might also or alternatively be configured to communicate using WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106A through 106N) in communication with the base station 102. The UE 106 may be a device with wireless network connectivity such as a mobile phone, a hand-held device, a computer or a tablet, or virtually any type of wireless device.

The UE may include a processor that is configured to execute program instructions stored in memory. The UE may perform any of the method embodiments described herein by executing such stored instructions. The UE may also or alternatively include a programmable hardware element such as an FPGA (field-programmable gate array) that is configured to perform any of the method embodiments described herein, or any portion of any of the method embodiments described herein.

The UE 106 may be configured to communicate using any of multiple wireless communication protocols. For example, the UE 106 may be configured to communicate using two or more of CDMA2000, LTE, LTE-A, Wi-Fi, or GNSS. Other combinations of wireless communication standards are also possible.

The UE 106 may include one or more antennas for communicating using one or more wireless communication protocols. The UE 106 may share one or more parts of a receive and/or transmit chain between multiple wireless communication standards; for example, the UE 106 might be configured to communicate using either of CDMA 2000 (1xRTT/1xEV-DO) or LTE using a single shared radio. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1 xRTT, and separate radios for communicating using each of Wi-Fi and Bluetooth. Other configurations are also possible.

Figure 3:
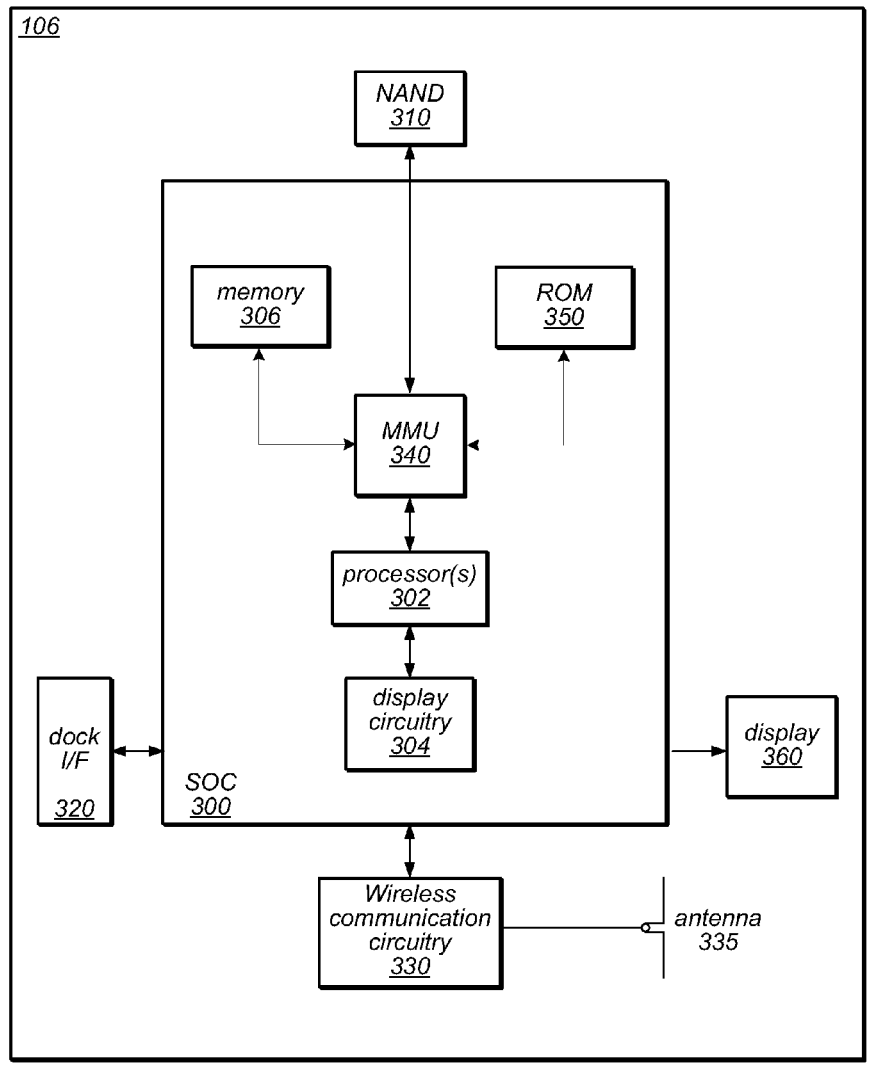
FIG. 3 is an example block diagram of a user equipment device.

FIG. 3—Exemplary Block Diagram of a UE

FIG. 3 illustrates an exemplary block diagram of a UE 106. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330 (also referred to as a "radio"), connector I/F 320, and/or display 360. The MMU 340 may be configured to perform memory protection and page table translation or set up. In some embodiments, the MMU 340 may be included as a portion of the processor(s) 302.

As also shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, CDMA2000, Bluetooth, WiFi, etc.).

As noted above, the UE 106 may be configured to communicate wirelessly using multiple wireless communication standards. As further noted above, in such instances, the wireless communication circuitry (radio(s)) 330 may include radio components which are shared between multiple wireless communication standards and/or radio components which are configured exclusively for use according to a single wireless communication standard. As shown, the UE device 106 may include at least one antenna (and possibly multiple antennas, e.g., for MIMO and/or for implementing different wireless communication technologies, among various possibilities), for performing wireless communication with cellular base stations and/or other devices. For example, the UE device 106 may use antenna 335 to perform the wireless communication.

Figure 5:
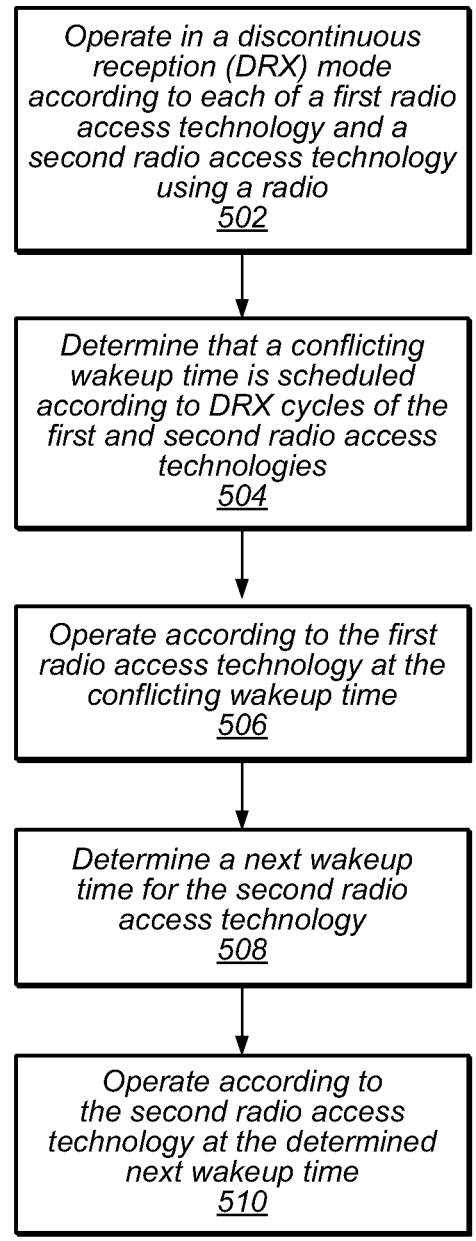
FIG. 5 is a flowchart diagram illustrating an exemplary method for handling conflicts between radio access technologies (RATs) in a multi-RAT user equipment device.

As described herein, the UE 106 may include hardware and software components for implementing features for handling conflicts between RATs, such as those described herein with reference to, inter alia, FIG. 5. The processor 302 of the UE device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components 300, 304, 306, 310, 320, 330, 335, 340, 350, 360 may be configured to implement part or all of the features described herein, such as the features described herein with reference to, inter alia, FIG. 5.

Figure 4:
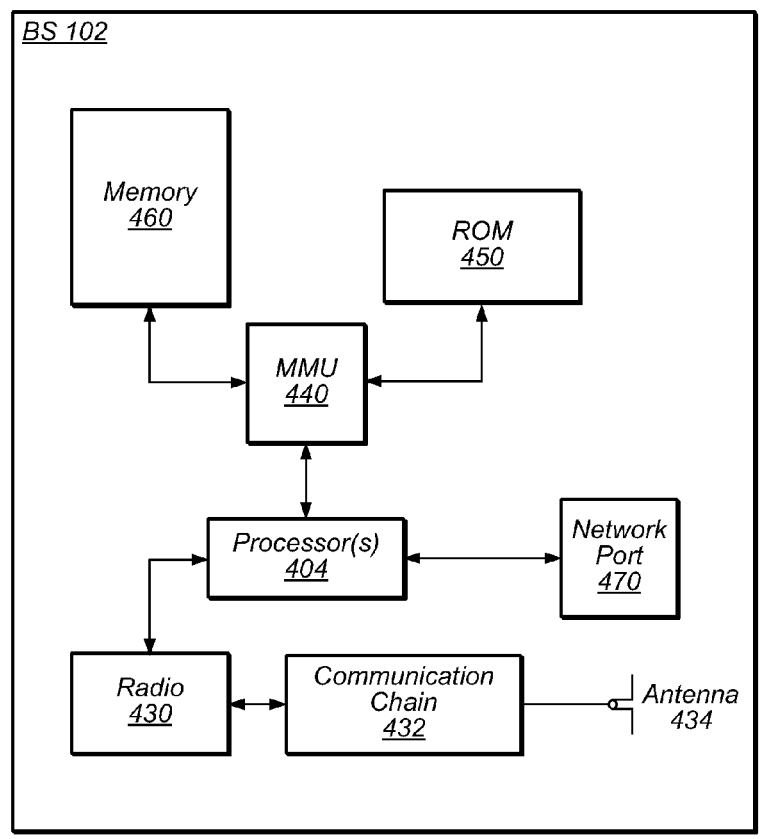
FIG. 4 is an example block diagram of a base station.

FIG. 4—Base Station

FIG. 4 illustrates an exemplary block diagram of a base station 102. It is noted that the base station of FIG. 4 is merely one example of a possible base station. As shown, the base station 102 may include processor(s) 404 which may execute program instructions for the base station 102. The processor(s) 102 may also be coupled to memory management unit (MMU) 440, which may be configured to receive addresses from the processor(s) 102 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, WCDMA, CDMA2000, etc.

The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof.

FIG. 5—Flowchart

FIG. 5 is a flowchart diagram illustrating a method for handling conflicts between radio access technologies (RATs) in a device configured to operate according to multiple RATs using a shared radio. The method may be implemented by a wireless UE device (such as UE 106), which may be configured to communicate using multiple RATs.

The UE 106 may be configured to communicate using multiple RATs (e.g., multiple cellular communication protocols) using a shared radio. For example, one or more RF signaling components, such as one or more antennas, gain elements, filtering elements, ADCs and/or DACs, and/or other analog or digital circuitry may be used to perform wireless communication by the UE according to any of the multiple RATs using the shared radio. Note that not all RF components may need to be shared by the RATs for the radio to be considered shared. It may be the case that at any given time, only one of the RATs sharing a radio may operate.

Sharing a radio between two (or more) RATs may be advantageous for energy efficiency, manufacturing cost, and form factor of a UE 106, among other possible advantages. However, if the UE 106 can only one operate according to one of the RATs at a time, it is possible that conflicts may occur between the RATs, e.g., when both RATs are scheduled to or otherwise have reason to use the radio during an overlapping time period.

In particular, it is common for RATs to operate in a discontinuous reception (DRX) mode. Different types of DRX modes of operation exist, including for example idle-mode DRX and connected-mode DRX. In a DRX mode of operation, a RAT (i.e., a protocol stack in the UE 106 operating according to a RAT) may generally actively operate (e.g., including using the radio and/or performing other functions) for short "wakeup" or "on-duration" periods of time, and operate in a reduced power state for longer periods of time between the wakeups in an alternating cyclical or regular periodic manner. During the active portion of the DRX cycle for a RAT, the UE 106 may be configured to perform any of a variety of operations (e.g., specified by the RAT protocol and/or a network operator providing service according to the RAT). For example, common operations for a UE 106 during a wakeup portion of a DRX cycle might include checking for (and potentially decoding) paging messages from a network, and performing signal strength measurements for a serving cell and possibly also for neighboring cells.

Since DRX operation for a given RAT is generally configured such that the "sleeping" portion of the cycle, e.g., in which the radio is not being used, is longer than the "waking" portion of the cycle, it is generally possible for multiple RATs to operate in a DRX mode of operation simultaneously using a shared radio without conflict. However, it is also possible that occasionally, or possibly regularly (e.g., depending on DRX cycle scheduling), conflicts may occur between the RATs such that both RATs are scheduled to wakeup during an overlapping time period. In other words, both RATs may be scheduled to use the radio at the same time, even though the device may not support simultaneous use of the (shared) radio by both RATs.

Accordingly, the UE 106 may be configured to handle such conflicts. FIG. 5 illustrates one such method. The method shown in FIG. 5 may be used in conjunction with any of the systems or devices shown in the above Figures, among other devices. In various embodiments, some of the method elements shown may be performed concurrently, in a different order than shown, or may be omitted. Note also that additional method elements may also be performed as desired. The method may be performed as follows.

In 502, the UE 106 may operate in a DRX mode according to each of a first RAT and a second RAT using a radio. As described above, the radio may be shared between the RATs, such that only one RAT may have use of the radio at any given time. The RATs may be any of a variety of RATs; as one example, the first RAT might be CDMA 2000 1xRTT ("1x"), while the second RAT might be LTE. For example, the UE might utilize 1x for voice calls and SMS service and LTE for data services. Other combinations of RATs (including uses of one or more of the above-mentioned RATs for different services) are also possible.

Thus, at certain times the UE 106 may operate according to the first RAT and at other times the UE 106 may operate according to the second RAT. Note that in some cases it may be possible for the UE 106 to operate according to both the first RAT and the second RAT simultaneously even if simultaneous radio usage by both the first RAT and the second RAT is not possible. For example, a protocol stack according to the first RAT might be active and using the radio, while a protocol stack according to the second RAT might be active but not using the shared radio. In such a case, the second RAT might perform offline data processing and/or higher (e.g., non-access stratum) layer functionality while active but not using the shared radio. Alternatively, it may be possible that the UE 106 can only operate according to one RAT at a time.

In 504, it may be determined that a conflicting wakeup time is scheduled according to DRX cycles of the first and second RATs. As previously noted, even though it may be possible for the UE 106 to operate in DRX modes of both the first and second RAT simultaneously without conflict, it is also possible that in some cases the times at which the first and second RAT are scheduled to use the radio may conflict.

The conflict may be a one-time conflict, or more commonly, may be a re-occurring conflict. For example, it is common for even different RATs to use integer multiples of 1.28 s as the length of the idle-mode DRX cycle. Thus, if by chance the wakeup times for the first RAT and the second RAT are scheduled to conflict once, it is likely that they will conflict again, since even if the DRX cycle lengths are not exactly the same, one may be an integer multiple length of the other. For example, if the DRX cycle length according to the first RAT is 5.12 s and the DRX cycle according to the second RAT is 1.28 s, if there is a conflict once, there may be a conflict again every time the first RAT is scheduled to wakeup and every fourth time the second RAT is scheduled to wakeup.

Note that for idle-mode DRX cycles, it is common for the wakeup time for a UE 106 for a given RAT to be determined based on subscriber identity information (e.g., an international mobile subscriber identity (IMSI), which may be stored in a subscriber identity module (SIM)) for the UE 106. Different RATs (or even different operators of networks using a same RAT) may calculate scheduled wakeup times (e.g., paging opportunities) in different manners (e.g., using different equations/formulas) and may typically be de-coupled from each other in terms of system time. Thus, there may be a low likelihood for wakeup times for multiple RATs to conflict for any given individual UE 106, but given a large enough number of UEs, it is highly possible that at least a few will experience scheduling conflicts at any given time. Since the wakeup times may be scheduled in a predictable manner (e.g., based on IMSI in a manner defined by the network operator and based on the network system time), it may be relatively simple for the UE 106 to determine (e.g., calculate) when such conflicts will occur.

Note that in some cases, one or both of the RATs may be operating using connected-mode DRX rather than an idle-mode DRX. In this case, it may be more likely that conflicts may be single-occasion occurrences rather than repeating occurrences. This may be because connected-mode DRX cycles may have different lengths and/or length multiples than idle mode DRX cycles, and/or because scheduled wakeup times may be based on different criteria than for idle-mode DRX cycles. On the other hand, connected-mode DRX cycles may typically be much shorter than idle-mode DRX cycles, so the likelihood that wakeup times may randomly conflict if one (or both) of the RATs is operating using connected-mode DRX may be higher.

In 506, the UE 106 may operate according to the first RAT at the conflicting wakeup time. The first RAT may be selected to have use of the radio at the conflicting wakeup time for any of a variety of reasons, which may particularly be related to differences in characteristics and/or use patterns between the first and second RAT. For example, the first RAT may be given priority based on differences between the RATs in frequency of use, throughput, DRX cycle lengths, lengths of time since previous wakeups, etc. The selection may be consistent and fixed (e.g., every time a conflict occurs, the first RAT may be given priority) or variable on a case-by-case basis.

As one example, consider again a case in which the first RAT is 1x and the second RAT is LTE. The 1x system may be used (primarily, or possibly only) for voice calls and SMS messages while the LTE system may be used (primarily, or possibly only) for data. Voice calls may be considered a higher priority use of the UE 106, and so priority may be given consistently to the 1x system in response to detected conflicts, in order to ensure that any paging messages indicating that the UE 106 has a mobile terminated (MT) voice call are received. Alternatively, if data service were considered higher priority, priority could be given consistently to the LTE system in response to detected conflicts.

As another possibility, if the first and second RAT have different DRX cycle lengths, priority may be given to the system with the longer DRX cycle (e.g., since the system with the shorter DRX cycle may be scheduled to wakeup again sooner than the system with the longer DRX cycle). For example, if the first RAT has a DRX cycle length of 5.12 s, while the second RAT has a DRX cycle length of 1.28 s, priority might be consistently given to the first RAT.

Other DRX cycle lengths and functionality than those given in the above examples are also possible for each RAT. For example, it is also possible that both RATs may have the same DRX cycle length and similar inherent functionality/priority. In this case, one RAT may still consistently be given priority over the other for simplicity, or selection of a RAT to operate the radio at a conflicting wakeup time may alternate or be determined on a case-by-case basis.

In 508, a next wakeup time for the second RAT may be determined. Since the first RAT may have use of the radio at the conflicting wakeup time, the second RAT may be unable to perform the operations which it would normally perform using the radio at the conflicting wakeup time. While UE 106 could simply activate the second RAT as scheduled without using the radio while the first RAT is using the radio, then use the radio once the first RAT releases the radio, this would leave much to be desired. In particular, UE 106 would be using battery power to keep the second RAT active during the time of conflict without actually being able to use the radio, and any paging messages transmitted according to the second RAT during this paging opportunity would likely be missed since they would likely be transmitted during the conflicting wakeup time when the second RAT doesn't have use of the radio with which to receive them.

Alternatively, the UE 106 could simply have the second RAT remain inactive (sleeping) through the conflicting wakeup time and delay the operations which it would normally perform during the DRX cycle wakeup period until the wakeup period of the next DRX cycle according to the second RAT. However, if the UE 106 was in or moves to an area where the serving cell according to the second RAT is weak, delaying cell signal strength measurements and/or searches until the next DRX cycle wakeup period could cause the UE 106 to lose service according to the second RAT. This in turn would likely have a negative effect on user experience, as the UE 106 would have to re-acquire service/re-attach to a cell according to the second RAT, which could take a significant amount of time.

Accordingly, it may be desirable for the UE 106 to determine when would be an appropriate next wakeup time for the second RAT. In particular, it may be desirable to determine if adequate service could be provided if the second RAT were to wait until the next DRX cycle wakeup time to use the radio, or if it would be desirable to make use of the radio as soon as it is released by the first RAT.

Selection of the next wakeup time for the second RAT may be based on any of a number of factors. For example, one factor which may affect the selection of the next wakeup time for the second RAT is whether or not the UE 106 has data pending for uplink transmission according to the second RAT. If the UE 106 does have data pending for uplink transmission according to the second RAT, this may be an indication that the second RAT should make use of the radio substantially immediately after the first RAT releases the radio, e.g., in order to transmit the pending uplink data.

Other factors which may be considered in selecting the next wakeup time for the second RAT may be related to signal strength (e.g., RSRP, Ec/Io, etc., depending on the RAT) of a serving cell for the second RAT. For example, the length of time since the second RAT has most recently measured the signal strength of the serving cell (and possibly neighboring cells), and the signal strength of the serving cell measured at that time, may be factors on which the selection may be based.

The actual mechanism for selecting the next wakeup time may be based on the factors considered in any of a variety of ways, as desired. For example, as one possibility, if signal strength of the second RAT serving cell has not been measured recently (e.g., less recently than a time threshold) or is sufficiently weak (e.g., less than a first signal strength threshold), it may be determined that there is sufficient risk of a weak serving cell that the second RAT should wakeup and perform serving cell measurements (and possibly a neighboring cell search and measurements and cell re-selection) within a relatively short period of time (e.g., substantially immediately) after the first RAT releases the radio.

However, if signal strength of the second RAT serving cell has been measured recently (e.g., more recently than the time threshold) and is sufficiently strong (e.g., greater than the first signal strength threshold), it may be determined that the serving cell is sufficiently strong that wakeup can be delayed until the next DRX cycle wakeup period.

Furthermore, if desired, a second signal strength threshold may be used, e.g., to determine if the most recent signal strength measurement indicated an adequate signal or an excellent signal; this may in turn be used to determine a type or degree of search/measurement to be performed during the next DRX cycle wakeup period. For example, if a recent signal strength measurement of the second RAT serving cell indicates that the serving cell has excellent signal strength (e.g., greater than a second signal strength threshold, which may be higher than the first signal strength threshold), it may be determined to perform an "offline" or more basic signal strength measurement in the next DRX cycle wakeup period. But if a recent signal strength measurement of the second RAT serving cell indicates that the serving cell has only adequate signal strength (e.g., less than the second signal strength threshold, though still greater than the first signal strength threshold), it may be determined to perform an "online" or more extensive signal strength measurement in the next DRX cycle wakeup period.

In 510, the UE 106 may operate according to the second RAT at the determined next wakeup time. In particular, the UE 106 may utilize the radio according to the second RAT at the determined next wakeup time. The UE 106 may perform any of various operations as normally scheduled and/or as determined in step 508, e.g., depending on when the determined next wakeup time is.

For example, if substantially immediately after the first RAT releases the radio (e.g., after using it during the conflicting wakeup time), measurements of the serving cell and search and measurements of neighboring cells may be performed using the radio. The UE 106 may also check for any paging messages according to the second RAT, though since it may not be the paging opportunity for the UE 106 according to the second RAT, it is also possible that the UE 106 may not check for paging messages in this case. Other operations may also or alternatively be performed as desired.

If the determined next wakeup time is the next scheduled wakeup time according to the DRX cycle of the second RAT, the UE 106 may also perform measurements of the second RAT serving cell and possibly search and measurements of neighboring cells operating according to the second RAT; however, the measurements may be either offline or online, e.g., depending on the length of time and/or the value of the most recent serving cell signal strength measurement. The UE 106 may also check for any paging messages according to the second RAT, since it may be a scheduled paging opportunity for the UE 106 according to the second RAT. Other operations may also or alternatively be performed as desired.

Thus, by intelligently selecting the next wakeup time for the second RAT (e.g., the RAT which is not selected to use the radio at the conflicting wakeup time), the UE 106 may advantageously strike a balance between device performance (e.g., by performing signal strength measurements sooner if there is danger of losing service by delaying and/or by transmitting pending uplink data sooner rather than later) and battery conservation (e.g., by delaying radio use if there does not seem to be danger of losing service by delaying and/or if there is not pending uplink data). As a result, the UE 106 may provide a high quality experience for a user of the UE 106 even when scheduled wakeup times for multiple RATs sharing a radio in the UE 106 conflict.

Exemplary Use Case

The following description includes details of an exemplary use case of the method of FIG. 5. Details of the exemplary use case provided hereinbelow are provided by way of example only and are not intended to be limiting to the disclosure as a whole. It will be recognized by those skilled in the art that numerous variations of and alternatives to the details of the exemplary use case are possible and should be considered within the scope of this disclosure.

In this example, the UE 106 may implement CDMA 2000 1xRTT ("1x") as the first RAT and LTE as the second RAT. In particular, 1x may be used for voice calls and SMS messages, while LTE may be used for data services. The 1x and LTE networks may be provided by the same service provider, but may not be coordinated (e.g., system times, configuration values, and other aspects may be de-coupled).

The idle-mode DRX cycle for 1x may be 5.12 s, while the idle-mode DRX cycle for LTE may be 1.28 s. If a conflict or collision between LTE and 1x occurs, 1x may be given priority. Thus, the 1x protocol stack may wakeup as scheduled and perform normal wakeup operations, e.g., per the 1x specification and network parameters.

The LTE protocol stack may also wakeup as scheduled, but may detect that 1x has its DRX wakeup time within the range of the LTE DRX wakeup time (e.g., may detect that a conflict exists between the wakeup times according to 1x and LTE). Accordingly, the LTE protocol stack may determine its next wakeup time according to the following conditions.

If there is pending uplink data to be transmitted, the LTE protocol stack may enter a suspended state (e.g., may go back to sleep), but may resume operations within a short amount of time (e.g., immediately or substantially immediately) after 1x finishes its actions related to the DRX wakeup and releases the radio.

If there is not any pending uplink data to be transmitted, the LTE protocol stack may determine how recently the serving cell's signal strength has been measured (e.g., how long since a previous wakeup), and what was the signal strength measured at that time.

If the measurement was longer ago than a time threshold (e.g., 5 s, 10 s, 15 s, or any other value as desired), the measurement may be considered old or stale, and may not be considered valid even if it indicated a high signal strength. In this case, the LTE protocol stack may enter a suspended state (e.g., may go back to sleep), but may similarly resume operations within a short amount of time (e.g., immediately or substantially immediately) after 1x finishes its actions related to the DRX wakeup and releases the radio.

If the measurement was more recent than the time threshold, but the signal strength (e.g., RSRP) measured was less than a first signal strength threshold (e.g., −100 dBm, −105 dBm, −110 dBm, or any other value as desired), the serving cell may be considered too weak. In this case, similarly, the LTE protocol stack may enter a suspended state (e.g., may go back to sleep) while the 1x protocol stack is using the radio, but may resume operations within a short amount of time (e.g., immediately or substantially immediately) after 1x finishes its actions related to the DRX wakeup and releases the radio.

If the measurement was more recent than the time threshold, and the signal strength measured was greater than the first signal strength threshold, the serving cell may be considered at least sufficiently good that the next wakeup time can be delayed until the next LTE DRX cycle. In this case, the LTE protocol stack may enter a suspended state (e.g., may go back to sleep), and may not resume operations until the scheduled wakeup time in the next LTE DRX cycle.

Depending on how good the most recent signal strength measurement was, the LTE may choose to perform a more- or less-intensive signal strength measurement regime in that next LTE DRX cycle. In particular, if the most recent signal strength measurement was greater than a second signal strength threshold (e.g., a higher threshold than the first signal strength threshold, e.g., −75 dBm, −80 dBm, −85 dBm, or any other value as desired), this may be considered an excellent signal strength, and a less-intensive signal strength measurement regime in that next LTE DRX cycle may be appropriate, while if the most recent signal strength measurement was less than the second signal strength threshold (though greater than the first signal strength threshold), this may be considered only an adequate or good signal strength, and a more-intensive signal strength measurement regime in that next LTE DRX cycle may be appropriate.

For example, the "less-intensive" regime may be an offline signal strength measurement, in which the radio is used only briefly to capture signals, which may then be processed (e.g., by digital signal processing circuitry or other processing hardware/software) to determine a signal strength value for the serving cell and possibly any very strong neighboring cells after the radio has been released. In contrast, the "more-intensive" regime may be an online signal strength measurement, in which the radio is used to capture signals for a more extended period of time, which may be processed in real-time to determine signal strength values for the serving cell and any neighboring cells.

Note that the above-described method for handling conflicts between RATs in a device which implements multiple RATs using a shared radio, in which an active determination is made as to whether a next wakeup time for the RAT which doesn't use the radio during a conflict should be substantially immediately after the other RAT releases the radio or can be delayed until a next regularly scheduled wakeup time, has significant advantages relative to techniques which always use the radio substantially immediately after the other RAT releases the radio or always delay until the next regularly scheduled wakeup time.

In particular, if the RAT always uses the radio substantially immediately after the other RAT releases the radio, this represents a significant additional power cost, which can decrease idle-time battery life by a significant amount (e.g., 15%, 20%, 25%, or possibly more), while if the RAT always delays until the next regularly scheduled wakeup time, it is highly possible that this may negatively affect the RAT's ability to maintain a good RF link with a serving cell, and may occasionally unnecessarily cause the UE 106 to incorrectly declare that no service according to that RAT is available.

In contrast, according to the above-described method, good service may be maintained (e.g., unnecessary loss of service may be avoided) without the full power cost required by always resuming radio use immediately after release of the radio by the other RAT after a conflict, thereby providing a better overall user experience.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a computer system may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a user equipment (UE) device, a tablet computer, a wearable computer, etc.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for operating a wireless user equipment (UE) device, the method comprising:
    while camped on a base station of a second wireless communication technology, the UE performing:
    operating in a discontinuous reception (DRX) mode according to each of a first wireless communication technology and a second wireless communication technology using a radio;
    determining that a conflicting wakeup time is scheduled according to DRX cycles of the first and second wireless communication technologies;
    operating according to the first wireless communication technology at the conflicting wakeup time, wherein radio use by the second wireless communication technology is suspended at the conflicting wakeup time;
    determining a next wakeup time for the second wireless communication technology to communicate with the base station,
    the determining including selecting the next wakeup time between A) a time immediately after release of the radio by the first wireless communication technology and B) a next scheduled wakeup time according to the DRX cycle of the second wireless communication technology, the selection based on whether a signal strength of a serving cell of the second wireless communication technology has been measured less recently than a time threshold; and
    operating according to the second wireless communication technology at the determined next wakeup time for the second wireless communication technology.

2. The method of claim 1,
    wherein determining the next wakeup time for the second wireless communication technology is based on an amount of time elapsed since a previous wakeup according to the second wireless communication technology and a most recent signal strength measurement of a serving cell for the second wireless communication technology.

3. The method of claim 1, wherein determining a next wakeup time for the second wireless communication technology comprises selecting the next wakeup time from:
    a time immediately after release of the radio by the first wireless communication technology; or
    a next scheduled wakeup time according to the DRX cycle of the second wireless communication technology.

4. The method of claim 3,
    wherein if the UE has uplink data to transmit using the second wireless technology, the time immediately after release of the radio by the first wireless communication technology is selected as the next wakeup time for the second wireless communication technology.

5. The method of claim 3,
    wherein if an amount of time elapsed since a previous wakeup according to the second wireless technology is greater than a time threshold, the time immediately after release of the radio by the first wireless communication technology is selected as the next wakeup time for the second wireless communication technology.

6. The method of claim 3,
    wherein if a most recent signal strength measurement is less than a first signal strength threshold, the time immediately after release of the radio by the first wireless communication technology is selected as the next wakeup time for the second wireless communication technology.

7. The method of claim 3,
    wherein if an amount of time elapsed since a previous wakeup according to the second wireless technology is less than a time threshold and a most recent signal strength measurement is greater than a first signal strength threshold, the next scheduled wakeup time according to the DRX cycle of the second wireless communication technology is selected as the next wakeup time for the second wireless communication technology.

8. The method of claim 7,
wherein if the most recent signal strength measurement is less than a second signal strength threshold, operating according to the second wireless communication technology at the determined next wakeup time for the second wireless communication technology comprises performing online signal strength measurements.

9. The method of claim 7,
wherein if the most recent signal strength measurement is greater than a second signal strength threshold, operating according to the second wireless communication technology at the determined next wakeup time for the second wireless communication technology comprises performing offline signal strength measurements.

10. A wireless user equipment (UE) device, the UE comprising:
a radio, comprising one or more antennas configured for wireless communication;
a processing element operably coupled to the radio;
wherein the radio and the processing element are configured to, while camped on a base station of a second radio access technology (RAT):
operate in a discontinuous reception (DRX) mode according to each of a first wireless communication technology and a second wireless communication technology using a radio;
determine that a conflicting wakeup time is scheduled according to DRX cycles of the first and second wireless communication technologies;
operate according to the first wireless communication technology at the conflicting wakeup time, wherein radio use by the second wireless communication technology is suspended at the conflicting wakeup time;
determine a next wakeup time for the second wireless communication technology to communicate with the base station,
the determining including selecting the next wakeup time between A) a time immediately after release of the radio by the first wireless communication technology and B) a next scheduled wakeup time according to the DRX cycle of the second wireless communication technology, the selection based on whether a signal strength of a serving cell of the second wireless communication technology has been measured less recently than a time threshold; and
operate according to the second wireless communication technology at the determined next wakeup time for the second wireless communication technology.

11. The UE of claim 10, wherein the next wakeup time is selected from one of:
immediately after completion of operations according to the first RAT during the first time; or
a next scheduled wakeup time according to a DRX mode for the second RAT.

12. The UE of claim 10, wherein the radio and the processing element are further configured to:
suspend operations according to the second RAT after determining the next wakeup time for the second RAT, wherein operations according to the second RAT remain suspended until the determined next wakeup time for the second RAT.

13. The UE of claim 10, wherein the radio and the processing element are further configured to:
select whether to operate the radio according to the first RAT or the second RAT at the first time based on determining that scheduled wakeup times in DRX modes of operation for the first and second RAT conflict at the first time;
wherein operating the radio according to the first RAT during the first time is based on selecting whether to operate the radio according to the first RAT or the second RAT at the first time.

14. The UE of claim 13, wherein selecting which RAT to operate the radio according to at the first time is based on one or more of:
differences between types of services provided by the first RAT and the second RAT;
frequency of use differences between the first RAT and the second RAT;
throughput differences between the first RAT and the second RAT;
DRX cycle lengths differences between the first RAT and the second RAT; or
length of time since previous wakeups for the first RAT and the second RAT.

15. A non-transitory computer accessible memory medium, comprising program instructions that, when executed at a wireless user equipment (UE) device, cause the UE to:
while camped on a base station of a second radio access technology (RAT):
operate in a discontinuous reception (DRX) mode according to both a first RAT and the second RAT using a shared radio, wherein DRX according to the first RAT has a first DRX cycle and DRX according to the second RAT has a second DRX cycle;
determine that a first wakeup time according to the first DRX cycle conflicts with a second wakeup time to communicate with the base station according to the second DRX cycle;
operate the radio according to the first RAT during the first wakeup time, wherein the second RAT does not operate the radio during the second wakeup time based on determining that the first wakeup time conflicts with the second wakeup time;
select a next wakeup time for the second RAT to communicate with the base station based on determining that the first wakeup time conflicts with the second wakeup time,
the selecting including selecting the next wakeup time between A) a time immediately after release of the radio by the first wireless communication technology and B) a next scheduled wakeup time according to the DRX cycle of the second wireless communication technology, the selection based on whether a signal strength of a serving cell of the second wireless communication technology has been measured less recently than a time threshold; and
operate according to the second wireless communication technology at the determined next wakeup time for the second wireless communication technology.

16. The memory medium of claim 15, wherein the first and second sets of conditions are based on one or more of:
a signal strength value of a most recent signal strength measurement of a serving cell for the second RAT;
an amount of time elapsed since the most recent signal strength measurement of the serving cell for the second RAT; or presence or absence of data pending for uplink transmission according to the second RAT.

17. The memory medium of claim 15,
wherein the first RAT is 1xRTT;
wherein the second RAT is LTE.

18. The memory medium of claim 15,
wherein the first DRX cycle has a different length than the second DRX cycle.

19. The memory medium of claim 15,
wherein the first RAT is used for voice communications, wherein the second RAT is used for data communications, wherein operating according to the first RAT during the first wakeup time is based at least in part on relative priority levels of voice communications and data communications.

20. The memory medium of claim 15,
wherein the DRX according to the first RAT comprises an idle mode DRX, wherein the DRX according to the second RAT comprises one of an idle mode DRX or a connected mode DRX.

21. An apparatus configured to control reconfiguration of multiple radio access bearers, the apparatus comprising:
a processing element for use in a mobile wireless device, wherein the processing element is configured to:
while camped on a base station of a second radio access technology (RAT): operate in a discontinuous reception (DRX) mode according to both a first RAT and the second RAT using a shared radio, wherein DRX according to the first RAT has a first DRX cycle and DRX according to the second RAT has a second DRX cycle;
determine that a first wakeup time according to the first DRX cycle conflicts with a second wakeup time to communicate with the base station according to the second DRX cycle;
operate the radio according to the first RAT during the first wakeup time, wherein the second RAT does not operate the radio during the second wakeup time based on determining that the first wakeup time conflicts with the second wakeup time;
select a next wakeup time for the second RAT to communicate with the base station based on the determining that the first wakeup time conflicts with the second wakeup time, the selecting including selecting the next wakeup time between A) a time immediately after release of the radio by the first wireless communication technology and B) a next scheduled wakeup time according to the DRX cycle of the second wireless communication technology, the selection based on whether a signal strength of a serving cell of the second wireless communication technology has been measured less recently than a time threshold;
and
operate according to the second RAT at the second wakeup time.

22. The apparatus of claim 21,
wherein the first RAT is fixed such that every time a conflict occurs, the first RAT is given priority over the second RAT.

23. The apparatus of claim 21,
wherein the first RAT is variable such that selection of the first RAT is based on one or more variables.

24. The apparatus of claim 23,
wherein the one or more variables includes: a relative frequency of use as between the first RAT and the second RAT, a difference in throughput as between the first RAT and the second RAT, a difference in DRX cycle length as between the first RAT and the second RAT, and a length of time since a previous wakeup.

25. The apparatus of claim 21,
wherein if uplink data is ready for transmission using the second RAT, the time immediately after release of the radio by the first RAT is selected as the next wakeup time for the second RAT.

26. The apparatus of claim 21,
wherein the processing element comprises an integrated circuit.

27. The apparatus of claim 21,
wherein the processing element comprises a processor and memory.

28. The apparatus of claim 21,
wherein the processing element comprises a programmable hardware element.

* * * * *